United States Patent Office 3,394,099
Patented July 23, 1968

3,394,099
CHLOROPRENE POLYMER CEMENTS
Robert Roth Garrett, West Chester, Pa., assignor to E. I. du Pont de Nemours and Company, Wilmington, Del., a corporation of Delaware
No Drawing. Filed Jan. 11, 1966, Ser. No. 519,966
7 Claims. (Cl. 260—38)

ABSTRACT OF THE DISCLOSURE

An organic solvent-type adhesive composition comprising a chloroprene polymer and the interreaction product of a basic metal oxide and an oil-soluble, heat-reactive phenol-formaldehyde resin has improved flocculation and stratification properties by employing as said resin one having a number-average molecular weight of at least about 1200 with at least 85 weight percent of the resin having molecular weights of at least about 600 and at least about 99 weight percent of the resin having molecular weights of at least 400.

---

This invention relates to improved solvent cements prepared from chloroprene polymers.

The preparation of solvent cements containing chloroprene polymers is well-known in the art. It is common practice to include in these cements reaction products of certain basic metal oxides with heat-reactive phenol-formaldehyde resins. The cements so prepared are dispersions of insoluble solid components in a liquid phase which consists of the solvent and the material soluble therein. These dispersions have a strong tendency, on standing, to flocculate and stratify into separate layers. This stratification is inconvenient to the user.

It has unexpectedly been found that organic solvent cements of chloroprene polymers containing interreaction product of a basic metal oxide with an oil-soluble, heat-reactive phenol-formaldehyde resin can be greatly improved, particularly with respect to flocculation and stratification, by using as the phenol-formaldehyde resin one having a number-average molecular weight of at least about 1200 and a molecular weight distribution such that at least 85 weight percent is composed of species having molecular weights of about 600 and greater and at least 99 weight percent is composed of species having molecular weights of about 400 and greater.

The upper range of the molecular weight is not particularly critical and is limited principally by the processes employed in the preparation of the resin. From a practical standpoint, the upper limit of the number-average molecular weight is about 2500 for resins prepared by chemical methods presently employed. Particularly preferred are resins whose molecular weight is at least about 1700 wherein at least 99 weight percent of the material has a molecular weight of about 600 and greater.

The term "chloroprene polymers" as used herein includes homopolymers of chloroprene as well as copolymers of chloroprene with sulfur or with up to an equal weight of another copolymerizable olefinic compound, e.g., vinyl-substituted aromatic compounds, such as styrene, vinyltoluenes, and vinylnaphthalenes; esters and nitriles of arcylic acid and methacrylic acid, such as methyl methacrylate and acrylonitrile; and compounds containing conjugated double bonds, such as 1,3-butadiene, isoprene, and 2,3-dichloro-1,3-butadiene. The preparation of the chloroprene polymers is well known in the art.

Any of the volatile solvents or mixtures of solvents conventionally used in the preparation of polychloroprene solvent cements may be used in preparing the cements of this invention. Optimum results are obtained when the solvent is substantially free of low-molecular-weight polar materials. For example, when ethyl acetate is used as a solvent component, it should be substantially free of ethanol. For a discussion of suitable solvents see, for example, column 3 of Garrett, U.S. Patent 3,185,658. The use of a suitable solvent component is within the scope of those skilled in the art.

The resins to be used in practicing this invention may be derived from the conventional oil-soluble, heat-reactive resins of the prior art, which are prepared by reacting one to 2 moles of formaldehyde with one mole of a para-substituted phenol in the presence of an alkaline catalyst. A discussion of suitable para-substituted phenols appears in column 2, lines 35–46, of Garrett, U.S. Patent 3,185,658. The conventional resins prepared in this way have typical number average molecular weights of 750 to 1000 and contain substantial amounts of material having molecular weights less than 600. From these conventional resins one may isolate by solvent fractionation the desired high-molecular-weight material. For a discussion of fractional extraction see Flory, Principles of Polymer Chemistry, 1953, pages 341–2. More conveniently, a conventional resin may be treated in such a way as to increase its number average molecular weight and reduce the content therein of low-molecular-weight species. Suitable methods includes reaction with polyisocyanates or acid-catalyzed condensation reactions, e.g., using phosphoric acid or phosphorus pentoxide. Other methods will readily occur to those skilled in the art.

The high-molecular-weight resins react with such basic metal oxides as magnesia in the same way as the conventional oil-soluble, heat-reactive resins of the prior art. The high-molecular-weight resins have fairly sharp softening points which lie in the range of about 125° C. to 135° C. After there resins are reacted with a basic metal oxide such as magnesia, the reaction products no longer exibit this softening behavior and, in fact, do not soften below their decomposition point.

A number of basic metal oxides are known to react with phenolic resins to give reaction products which have decomposition points rather than softening points. Of these, the most important and the most widely used is magnesia because of the excellent results obtained when magnesia is used. Other metal oxides such as lead oxide may be used.

In preparing the solvent cements, the resin and the metal oxide may be reacted in advance, or the reaction may be allowed to take place in the presence of the polymer and other components of the cement. The separate reaction of resin and magnesia is described in U.S. Patents 3,044,976 (to Brooks et al.) and 3,185,658. The reaction of the resin and the metal oxide in the presence of the other components of the cement is described in U.S. Patents 2,918,442 (to Gerrard et al.) and 3,185,-658.

The proportions of the various components in the solvent cement will, in general, be those conventionally used in the preparation of chloroprene polymer solvent cements.

The proportion of the reaction product of the resin with the metal oxide will depend largely on the particular properties desired in the cement. In general, an amount prepared from about 10 to about 100 parts by weight of resin, per 100 parts of chloroprene polymer, represents the most desirable range. Cohesive strength at elevated temperatures is almost directly proportional to the amount of heat-reactive resin in amounts up to about 40 to 45 parts of resin per 100 parts of chloroprene polymer. More than 45 parts makes the adhesive film brittle, but other properties, such as adhesion to metals, are improved when higher amounts of resin are used.

The amount of basic metal oxide required to react with the resin will vary with the molecular weight of the resin and of the metal oxide being used. It has been observed that approximately 2 moles of magnesia will react with each mole of resin when the reaction is carried to completion. In general, the amount of magnesia required is about 3 to 6 parts per 100 parts of resin. Thus, with amounts of resin ranging from 10 to 100 parts, about 0.3 part to about 6 parts of magnesia should be present for reaction (or reacted with the resin in advance). If basic metal oxides other than magnesia are used, chemically equivalent amounts should be used.

In compounding chloroprene polymers, magnesia is usually added to act as acid acceptor and to improve the processing safety of chloroprene polymer stocks containing zinc oxide. The amount of magnesia recommended ranges from about one to about 10 parts by weight per 100 parts of polymer, and this amount of magnesia may be incorporated in addition to the amount of basic metal oxide reacted with the resin. Four parts of magnesia is the amount most often recommended in chloroprene polymer compounding recipes.

Other compounding ingredients conventionally used in the preparation of chloroprene polymer solvent cements may be added. Zinc oxide is usually added to serve as an acid acceptor and a cross-linking agent which slowly vulcanizes the deposited films at room temperature. Amounts ranging from 2 to 20 parts per 100 parts of chloroprene polymer may be used. Five parts is the amount most often recommended. An antioxidant is usually incorporated. Other compounding ingredients such as accelerators, fillers and pigments may be used if desired.

The amount of solvent in the final cement composition will depend on such factors as the particular use to be made of the cement, the viscosity desired, and the solubility of the particular chloroprene polymer or resin. In general, the solids content of the cement will vary between 15 and 55 percent by weight. The preferred solids content in the solvent cement is about 20 to 30 percent by weight.

The preparation of the solvent cements, except for the incorporation of the high-molecular-weight resin, follows conventional procedures such as those discussed in U.S. Patent 3,185,658.

The invention will now be described with reference to the following examples of specific embodiments thereof wherein parts and percentages are by weight unless otherwise specified.

EXAMPLE 1

(A) Chloroprene polymer

The chloroprene polymer is compounded by mixing ingredients on a rubber mill at 50° C. for 10–15 minutes using the following recipe:

| | Parts |
|---|---|
| Chloroprene polymer (prepared as described in Example 6 of U.S. Patent 2,494,087) | 100 |
| Zinc oxide | 10 |
| Magnesia | 8 |
| N-phenyl-1-naphthylamine (antioxidant) | 2 |

(B) Phenol-formaldehyde resin

A commercially-available resin is selected which was prepared by reacting one to two moles of formaldehyde with one mole of p-tert-butylphenol under alkaline condition. ("Bakelite CKR 1634" supplied by Union Carbide Corp.) The molecular weight is 986. About 77% of the resin has a molecular weight greater than 600 and about 89% has a molecular weight greater than 400. To increase the molecular weight, an 800 g. sample is heated to 120° C. for 30 minutes with agitation. 0.8 ml. of 85% phosphoric acid is added and stirring is continued at 120–130° C. for an additional 40 minutes. The product has a molecular weight of about 1700 and contains essentially no material having a molecular weight below 600.

The molecular weights given are number average molecular weights determined by vapor phase osmometry. Molecular weight distribution is determined by means of a fractionation procedure using methanol as a solvent and water as a precipitant.

(C) Solvent

The solvent used consists of equal parts by weight of ethyl acetate, toluene, and hexane.

(D) Cement

The solvent cement is prepared using the following proportions of ingredients:

| | Parts |
|---|---|
| Compounded chloroprene polymer | 96 |
| Resin | 32 |
| Solvent mixture | 512 |

The proportions of ingredients in the final cements, based on 100 parts of chloroprene polymer, are:

| | Parts |
|---|---|
| Chloroprene polymer | 100 |
| Resin | 40 |
| Zinc oxide | 10 |
| Magnesia | 8 |

These ingredients are stirred together in a closed flask at room temperature for 17.5 hours. At the end of this time stirring is stopped and the cement is poured into glass containers of dimensions about 1½" x 1½" x 3" high, allowed to stand, and is observed for the appearance of a supernatant liquid layer above a layer of precipitated solids. Percent settling is defined as:

$$\frac{\text{height of supernatant liquid}}{\text{overall height of cement}} \times 100$$

Observations made after 3 days and 76 days at both 25° C. and 50° C. indicated that the cements of this invention exhibited zero percent settling, i.e., there was no detectable supernatant liquid.

If, for comparison, the above example is repeated using the resin without treatment to increase molecular weight, it is found that more than 60 percent settling typically takes place after only three days at either 25° C. or 50° C.

EXAMPLE 2

The commercially-available phenol-formaldehyde resin described in Example 1 ("Bakelite CKR1634") is separated into about 11 different fractions by extracting with methanol and precipitating with water. By combining the last four fractions, a resin is prepared having a calculated number-average molecular weight ($\overline{Mn}$) about 1967 with essentially 100 percent of the material having a molecular weight of above 600.

Using this resin cements are prepared essentially as described in Example 1 with the result that less than about 6 percent settling is noted after standing at 25° C. for 175 days.

If, for comparison, a cement is prepared using fractions having an $\overline{Mn}$ of about 767 with about 80.6% above 600 and about 90.9% above 400, considerable settling (e.g., 20%) can take place after only one day of standing at 25° C. and after 15 days a settling of as high as 75 percent may occur.

EXAMPLE 3

The experiment of Example 1 is repeated using instead a resin which has been prepared by heating a 32-g. sample of the commercially-available resin for 30 minutes and adding 0.1 g. of $P_2O_5$ at 130° C., stirring for an additional 10 minutes with agitation. The molecular weight is about 2070, and it is estimated that the resin contains less than 1% of material having a molecular weight of less than 600. After about 37 days at either 25°

C. or 50° C. the experimental cements show essentially no settling.

EXAMPLE 4

In this example the molecular weight of the commercially available resin identified in Example 1 is increased by reaction with a polyisocyanate by dissolving 50 grams of resin in 75 grams of toluene and adding to this solution 5 grams of a polyisocyanate of the general type described in U.S. Patent 2,683,730, corresponding to the formula

where R is phenylene and $n$ is an integer such that the amine equivalent of the isocyanate is approximately 136. The number average molecular weight, determined cryoscopically in benzene, is about 400. [The amine equivalent is defined as the number of grams of isocyanate which is consumed by one gram mole of a secondary amine, such as dibutylamine, in the formation of the corresponding urea. The procedure involved in making this determination is described in an article by Siggia and Hanna, Ind. and Eng. Chem., Analytical Edition, 20, 1084 (1948).] The solution containing the resin and the isocyanate is heated at 45° C. for 30 minutes and then at 55° C. for 3.5 hrs. During the heating the Brookfield viscosity (25° C.) increases from about 25 cps. to about 49 cps. To destroy any unreacted isocyanate, 84 ml. of the resin solution is mixed with an equal volume of dilute ammonia solution (about 14%). The mixture is shaken in a separatory funnel, and the layer containing the toluene solution of resin is retained. To an aliquot containing 33 g. of resin are added 123 g. of toluene, 171 g. of ethyl acetate, and 171 g. of hexane. To the solution is then added 96 g. of a mixture of a chloroprene polymer which has been compounded as described in Example 1. The polymer used in this example is prepared by polymerizing chloroprene at 10° C. in the presence of an alkyl mercaptan modifier. After standing 26 days at 25° C., the cement prepared from the isocyanate-treated resin has settled less than about 5%.

As can be seen from the above examples, the undesirable settling tendencies of chloroprene polymer cements can be virtually eliminated by following the teachings of this invention. It is especially advantageous that this problem can be solved without a sacrifice in bond strengths, for example, in canvas-to-canvas adhesion at both 25° and 100° C.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In a composition comprising (a) 100 parts of a chloroprene polymer dissolved in a volatile organic solvent, and (b) the interreaction product of 10 to 100 parts of an oil-soluble, heat-reactive phenol-formaldehyde resin with a basic metal oxide in an amount of 3 to 6 parts per 100 parts of resin, *the improvement* wherein said resin has a number-average molecular weight of at least about 1200 with at least 85 weight percent of the resin having molecular weights of at least about 600 and at least about 99 weight percent of the resin having molecular weights of at least 400.

2. A composition as defined in claim 1 wherein 40 to 45 parts of resin are present.

3. A composition as defined in claim 1 wherein said basic metal oxide is magnesia.

4. A composition as as defined in claim 3 wherein an additional 1 to 10 parts of magnesia and from 2 to 20 parts of zinc oxide are present in compounding the chloroprene polymer.

5. A composition as defined in claim 1 wherein the average molecular weight of said resin is at least 1700 with at least 99 weight percent of the resin having molecular weights of at least 600.

6. In an adhesive cement composition of about 15 to 55 weight percent solids content comprising (a) a volatile organic solvent solution of 100 parts of a chloroprene polymer compounded with 1 to 10 parts of magnesia and 2 to 20 parts of zinc oxide, and (b) the interreaction product of 40 to 45 parts of an oil-soluble, heat-reactive phenol-formaldehyde resin with 3 to 6 parts of magnesia per 100 parts of resin, *the improvement* wherein said resin has a number average molecular weight of at least about 1700 with at least 99 weight percent of the resin having molecular weights of at least about 600.

7. The improvement of the flocculation and stratification properties of a volatile organic solvent solution of a chloroprene polymer containing the interreaction product of a basic metal oxide with an oil-soluble, heat-reactive phenol-formaldehyde resin, which consists in using as said resin one having a number average molecular weight of at least about 1200 with at least 85 weight percent of said resin having molecular weights of at least about 600 and at least about 99 percent of said resin having molecular weights of at least about 400.

References Cited

UNITED STATES PATENTS

| 2,610,910 | 9/1952 | Thomson | 260—845 |
| 2,918,442 | 12/1959 | Gerrard et al. | 260—38 |
| 3,044,976 | 7/1962 | Brooks et al. | 260—32.8 |
| 3,185,658 | 5/1965 | Garrett | 260—38 |
| 3,242,113 | 3/1966 | Kell | 260—845 |
| 3,318,834 | 5/1967 | Tabiban | 260—31.2 |

MORRIS LIEBMAN, *Primary Examiner.*

L. T. JACOBS, *Assistant Examiner.*